United States Patent [19]

Nozu et al.

[11] Patent Number: 4,658,391
[45] Date of Patent: Apr. 14, 1987

[54] FOCUS ERROR DETECTION DEVICE FOR AN OPTICAL RECORDING/PLAYING BACK SYSTEM

[75] Inventors: Shinsaku Nozu; Katsuharu Sato; Hozumi Tanaka; Kenjiro Hamanaka, all of Tokorozawa, Japan

[73] Assignee: Pioneer Electronic Corporation, Tokyo, Japan

[21] Appl. No.: 662,149

[22] Filed: Oct. 18, 1984

[30] Foreign Application Priority Data

Oct. 19, 1983 [JP] Japan .............................. 58-161698[U]

[51] Int. Cl.⁴ ................................................. G11B 7/09
[52] U.S. Cl. ........................................ 369/45; 369/46; 250/201
[58] Field of Search ............................ 369/44, 45, 46; 250/201 DF

[56] References Cited

U.S. PATENT DOCUMENTS

| 4,163,149 | 7/1979 | Sawang | 369/121 |
| 4,446,545 | 5/1984 | Diyk | 369/44 |
| 4,541,082 | 9/1985 | Horikoshi | 369/46 |

FOREIGN PATENT DOCUMENTS 56-42060  10/1981  Japan .

Primary Examiner—Alan Faber
Attorney, Agent, or Firm—Schwartz, Jeffery, Schwaab, Mack, Blumenthal & Evans

[57] ABSTRACT

A focus error detection device to be used in an optical system for recording and/or playing back information, including a light detector made up of four light receiving elements arranged symmetrically with respect to the center of the light detector, a first operation circuit means connected to the light receiving elements for generating a focus error signal, and a second operation circuit means also connected to the light receiving elements for generating an off-set compensation signal. With this construction, and off-set of the focus error signal due to the deviation of the position of the reflection light beam is by far reduced as compared with the conventional devices.

2 Claims, 10 Drawing Figures

FOCUS ERROR DETECTION DEVICE FOR AN OPTICAL RECORDING/PLAYING BACK SYSTEM

BACKGROUND OF THE INVENTION

1. Field of the Invention

The present invention relates to a focus error detection device, and more specifically to a focus error detection device for an optical recording/playing back system.

2. Description of Background Information

In a system for optically recording or playing back information such as a compact disc player system or a video disc player system, it is general to provide a focus servo control system by which a record or a read out light beam is correctly focused on a record medium. Conventional focus error detection devices used in such systems are constructed such that a reflection beam is directed through a cylindrical lens to a light detector made up of a plurality of light receiving elements which are arranged symmetrically with respect to the center of the light detector. The focus error signal is derived by the subtraction between two sum signals each is obtained by the summation of output signals of two of light receiving elements which are arranged symmetrically with respect to the center of the light detector. However, the drawback was that an off-set of the focus error signal is inevitably generated when the direction of the light beam is shifted tangentially or normally to the recording tracks for the purpose of tracking control or jitter correction.

SUMMARY OF THE INVENTION

An object of the present invention is therefore to alleviate the drawback of conventional devices and to provide a focus error detection device which can reduce the off-set of the focus error signal due to the deviation of the position of the light beam on the light detector.

According to the present invention, the focus error detection device, in addition to the conventional elements thereof, includes a circuit for producing a pair of first sum signals respectively by adding output signals of two light receiving elements which are located on the same side of one of the boundary lines and to calculate a first differential signal by the subtraction between the first sum signals. Further, the device includes a circuit for producing a pair of second sum signals respectively by adding output signals of two light receiving elements which are located on the same side with respect to the other one of the boundary lines, and to calculate a second differential signal by the subtraction between the second sum signals. The first and second differential signals are multiplied with each other and used for the compensation of the off-set of the focus error signal.

Further scope of applicability of the present invention will become more apparent from the detailed description given hereinafter. However, it should be understood that the detailed decription and specific examples, while indicating preferred embodiments of the invention, are given by way of illustration only, since various changes and modifications within the spirit and scope of the invention will become apparent to those skilled in the art from this detailed description.

DETAILED DESCRIPTION OF PREFERRED EMBODIMENTS

Figure 1:
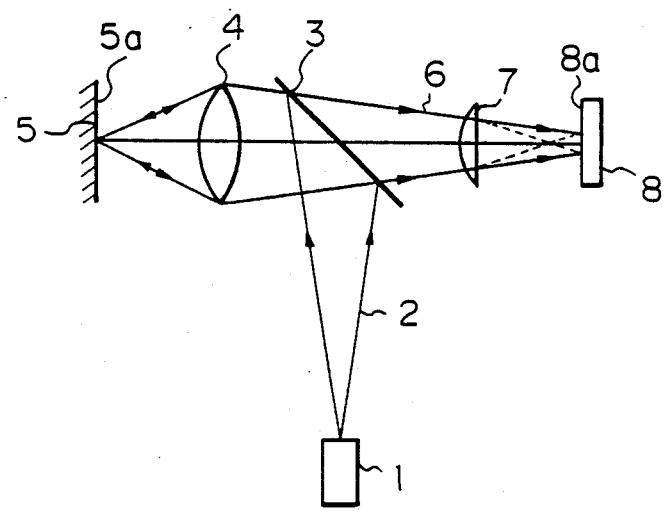
FIG. 1 is a schematic diagram of an example of the optical system used in the optical recording/playing back system.

Before entering into the explanation of the embodiments of the present invention, reference is first made to FIG. 1 in which a typical optical system used in the optical recording/playing back systems is illustrated.

In FIG. 1, the reference numeral 1 represents a light source and a beam emitted by this light source 1 is designated at 2. The beam 2 is reflected by a beam spritter 3 and directed to a record medium 5. The reference numeral 4 indicates an objective lens which focuses the beam reflected at the beam spritter 3 into an information surface 5a of the record medium 5. After reflection at the information surface 5a, the beam travels substantially the same path of the incident beam through the objective lens 4 and passes through the beam spritter 3. After that, the reflected beam which is indicated at 6 passes through a cylindrical lens 7 for providing astigmatism. After passing through the cylindrical lens 7, the beam converges into a position of a light detector 8. Between the two focal lines, i.e. a vertical line focus and a horizontal line focus, of the astigmatic beam through the cylindrical lens 7, there is a position in which the cross-section of the beam becomes a circle. The light detector 8 is disposed so that a light receiving surface 8a is placed in this position and the circular beam is received by the light detector 8.

Figure 2:
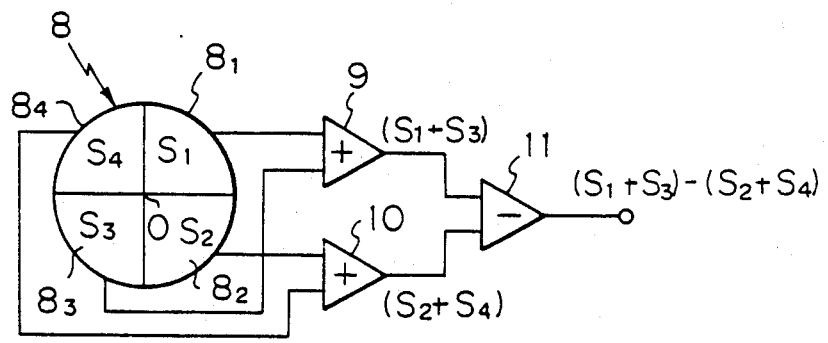
FIG. 2 is a block diagram showing an example of the conventional focus error detection device.

As shown in FIG. 2, the light detector 8 is of the so called quadrants type, and it is made up of four independent light receiving elements $8_1$ through $8_4$ which are arranged side by side and providing therebetween with two boundary lines crossing at substantially right angles.

Output signals of two light receiving elements $8_1$ and $8_3$ of this light detector 8 which are diagonally and symmetrically disposed with respect to the center O of the light receiving surface 8a and are applied to an adder 9. On the other hand, ouput signals of two light receiving elements $8_2$ and $8_4$ are applied to an adder 10. Output sum signals of the adders 9 and 10 are then applied to a subtractor 11 in which a differential signal of the input signals is derived and in turn output as a focus error signal.

In accordance with this differential output signal, the focus control of the optical system of FIG. 1 is performed.

Figures 3A, 3B, 3C:
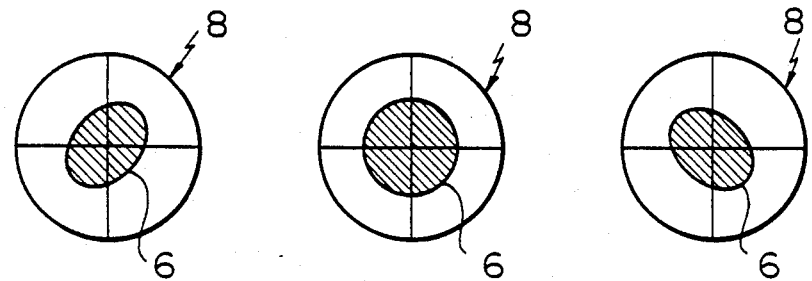
FIGS. 3A through 3C are diagrams showing the form of light beam applied on the light receiving surface of the light detector shown in FIG. 2 under various focus conditions.

The operation of the above device is as follows. When the record medium 5 is in the "in-focus" position, the reflected beam is received by the light receiving surface 8a of the light detector 8 and distributed thereon as schematically illustrated in FIG. 3B. In this state, the focus error signal FE is expressed by the following equation (1):

$$FE = (S_1 + S_3) - (S_2 + S_4) = 0 \qquad (1)$$

where Si (i=1, 2, 3, 4) is a low frequency component of each of the output signals of the light receiving elements $8_1$ through $8_4$.

On the other hand, if the position of the record medium 5 is deviated from the "in-focus" position, the distribution of the reflected beam becomes polarized as illustrated in FIG. 3A or FIG. 3C. Therefore, the focus error signal FE has a value greater or smaller than 0 (FE>0 or FE<0). This means that the direction and the magnitude of the focus error can be detected according to the sign and the level of the focus error signal.

Thus, with the conventional focus error detection system, the focus error signal is obtained as a differential signal between two sum signals each of which is generated by adding the output signal of two light receiving elements arranged symmetrically with respect to a center of light detector. Therefore, if the beam is shifted in a direction tangential with the recording track or a direction perpendidular thereto for the purpose of the tracking control or for the compensation of jitter, the focus error signal may include an off-set potential due to the change in the distribution of the light beam on the light receiving surface of the light detector.

Also, there is a method disclosed in publications such as the Japanese Pat. No. 56-42060, in which the off-set level is reduced in such a manner that the deviation of the position of the beam is detected and the focus error signal is compensated by a detection signal obtained by this deviation detection process.

However, this type of system also has a drawback that the multiplicity of circuit elements such as subtracting circuits and a multiplying circuits are required. Accordingly the circuit construction was complicated which in turn resulted in a relatively high cost.

The present invention is contemplated to alleviate these problems of conventional devices and to provide a focus error differential system in which the off-set of the focus error signal which is caused by the deviation of the beam on the light receiving surface of the light is by far reduced.

The first embodiment of the focus error detection device according to the present invention will be described hereinafter with reference to the accompanying drawings.

Figure 4:
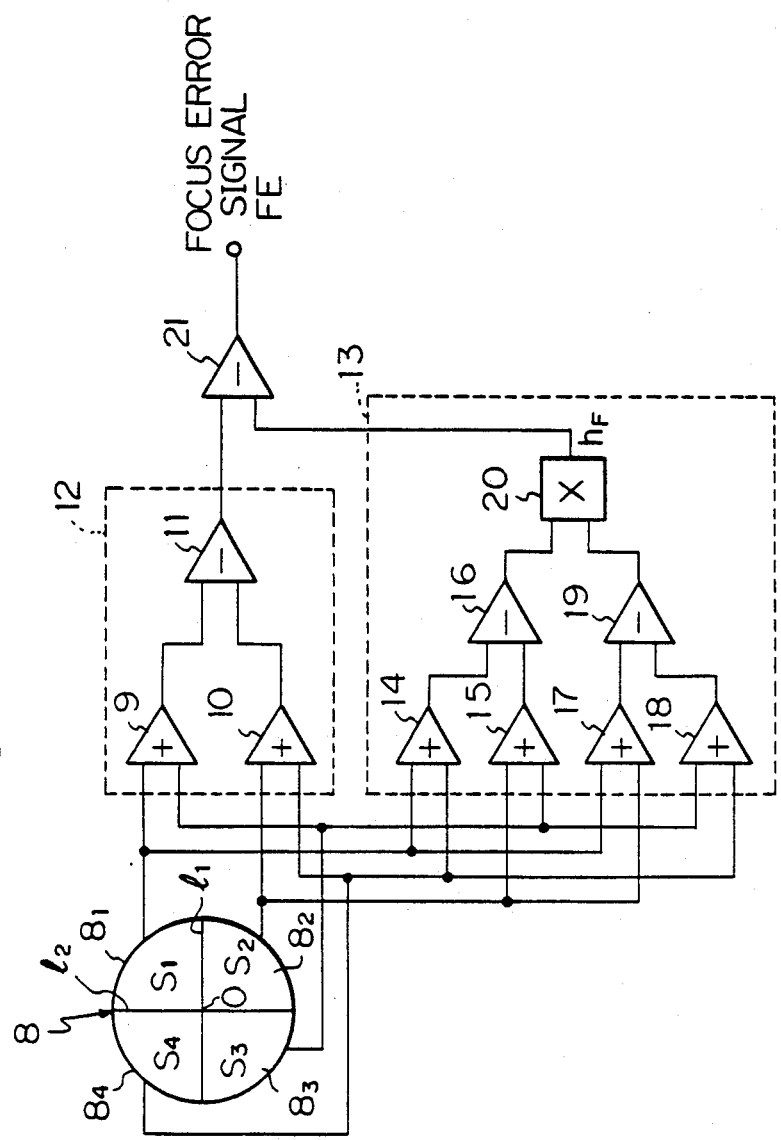
FIG. 4 is a block diagram of a first embodiment of the focus error detection device of the present invention.

In FIG. 4, the light detector 8 is identical with the conventional light detector, and therefore has four light receiving elements $8_1$ through $8_4$. As the conventional devices, output signals of two light receiving elements $8_1$ and $8_3$ which are arranged symmetrically with respect to the center of the light detector 8 are applied to an adder 9. Similarly, output signals of two light receiving elements $8_2$ and $8_4$ which are also arranged symmetrically with respect to the center of the light detector 8 are applied to an adder 10. Each output signal from adders 9 and 10 is then applied to a subtractor 11 in which a subtraction between two input signal takes place. In addition to the above conventional circuit elements which form a first operation circuit 12, the device is provided with a second operation circuit 13 which includes two pairs of adders 14, 15 and 17, 18 which respectively receive output signals of two light receiving elements which are arranged on the same side of one of the boundary lines $l_1$ and $l_2$. Specifically, the adders 14 and 15 receive output signals of light receiving elements $8_1$, $8_4$ and $8_2$, $8_3$ respectively. Similarly, the adders 17 and 18 receive output signals of light receiving elements $8_1$, $8_2$ and $8_3$, $8_4$ respectively. Further, the output signals of the adders 14 and 15 are then applied to a subtractor 16 and output signals of the adders 17 and 18 are applied to a subtractor 19. Then output signals of the subtractors 16 and 19 are applied to a multiplier 20.

Figure 5:
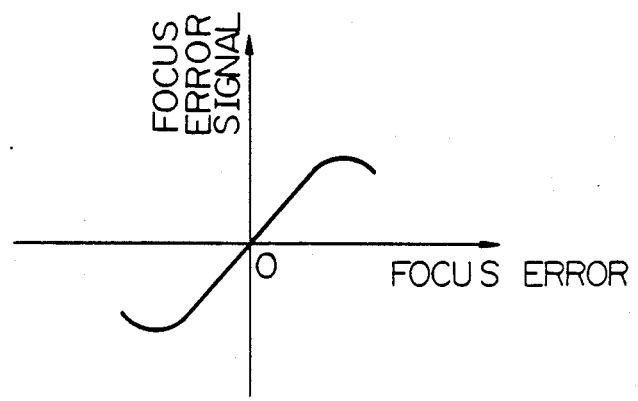
FIG. 5 is a graph showing the variation of the focus error signal with respect to the focus error.

If the focus error signal is derived by the conventional method as indicated by the equation (1), the level of the focus error signal varies as shown by the curve of FIG. 5 provided that the center of the light beam is aligned at the center of the light receiving surface 8a of the light detector 8. However, generally, the position of the beam may be shifted in the direction tangential with the recording track or the direction perpendicular thereto for the purpose of tracking control or jitter compensation. If such a shift of the position of the beam which is exemplary shown in FIG. 6 occurs, the focus error signal will contain an off-set such as shown by the dotted line (b) of FIG. 7.

The device according to the present invention is therefore designed to detect the magnitude of this off-set by means of the second operation circuit 13 described above.

Figure 6:
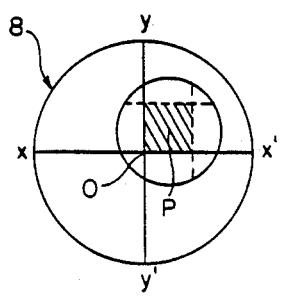
FIG. 6 is a diagram showing a state in which the center of the reflection light beam is deviated from the center of the light receiving surface of the light detector.
Figure 7:
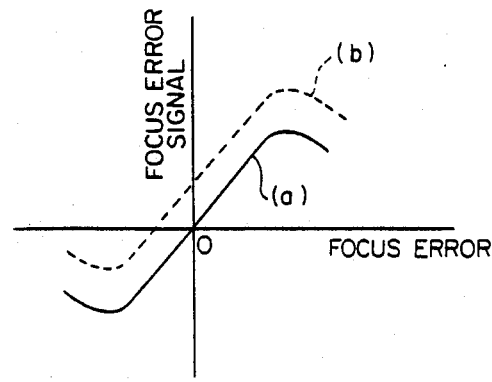
FIG. 7 is a graph showing the variation of the focus error signal under the condition illustrated in FIG. 6.

When an off-set such as shown in FIG. 6 is present, the magnitude of the off-set is approximately equal to the area of the square portion covered by the oblique lines of FIG. 6. In addition, the dotted lines which form two edges of the square respectively represent a line symmetrical with the boundary lines xx' or yy' of the light detector 8 with respect to the center P of the beam.

If the low frequency components of the output signals of the light receiving elements $8_1$ through $8_4$ are expressed as Si (i=1, 2, 3, 4), a signal $h_F$ corresponding to the area of the square covered by the oblique lines will be approximately expressed as follows:

$$h_F \alpha [(S_1 + S_4) - (S_2 + S_3)][(S_1 + S_2) - (S_3 + S_4)] \qquad (2)$$

As will be appreciated, the calculation according to the above equation is performed by the second operation circuit 13, and the signal $h_F$ obtained by the second operation circuit 13 forms a compensation signal to be used for the compensation of the off-set of the focus error signal produced by the first operation circuit 12.

By amplifying this signal $h_F$ at a suitable gain and then subtracting the amplified signal from the output signal of the first operation circuit 12 at a subtractor 21, a focus error signal FE after the compensation of off-set such as shown by the solid line (a) will be obtained. As seen from FIG. 7, this focus error signal FE indicated at (a) has a very little off-set component due to the deviation of the position of the center of the light beam on the light receiving surface as compared with the conventional focus error signal indicated at (b).

Figure 8:
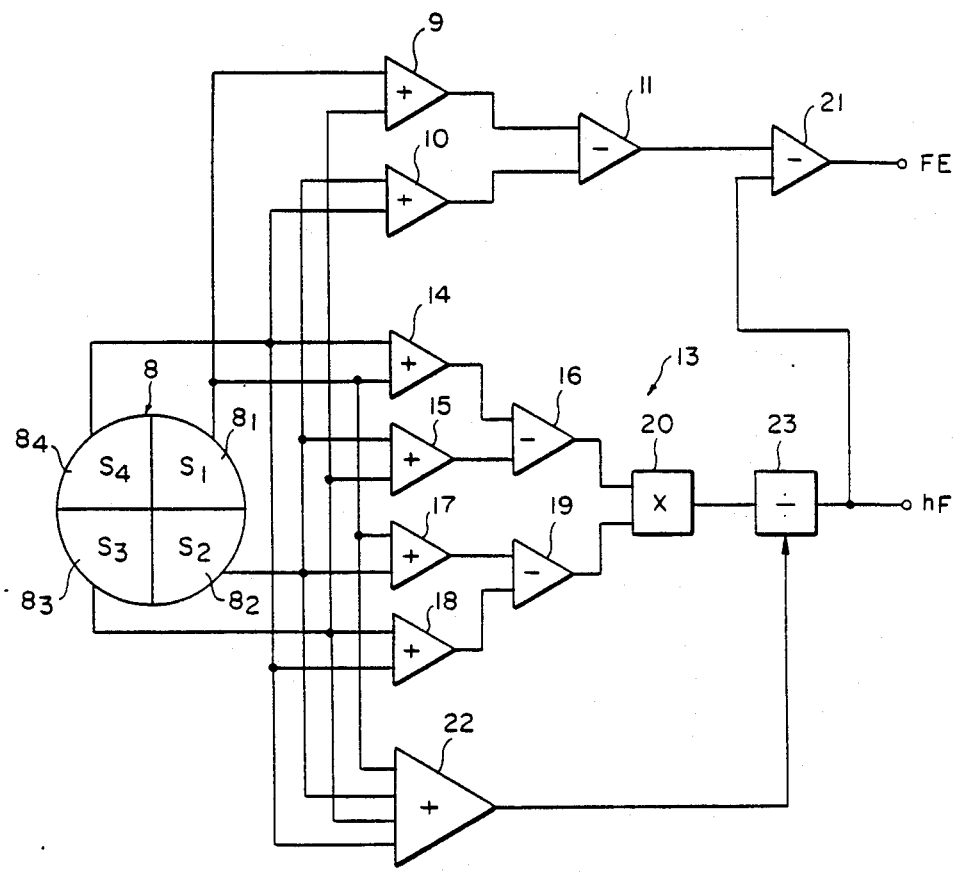
FIG. 8 is a block diagram of a second embodiment of the focus error detection device of the present invention.

FIG. 8 shows a second embodiment of the focus error detection device of the present invention.

As shown, the device includes, in addition to the circuit elements of FIG. 4, an adder 22 which receives the output signals of the light receiving elements 8₁ through 8₄, and a dividing circuit 23 which is connected to the multiplier 20 and receives an output signal of the adder 22. With this arrangement, the output signal from the multiplier 20 is divided by the output signal of the adder 22 at the dividing circuit 23 and output as the compensation signal. In the case of this embodiment, the compensation signal is standardized by the total amount of the light received by the light detector 8. Thus, the stability of the operation of the focus servo system can be improved by maintaining an optimum level of the compensation signal against the fluctuation of the intensity of reflected light as a result of the local deviation of the light reflectance of the record medium 5 which may be produced during the manufacturing process.

The compensation signal obtained by the embodiment of FIG. 8 is expressed by the following mathematical formula:

$$h_F \alpha \frac{[(S_1 + S_4) - (S_2 + S_3)][(S_1 + S_2) - (S_3 + S_4)]}{(S_1 + S_2 + S_3 + S_4)} \quad (3)$$

It will be appreciated from the foregoing, according to the present invention, a focus error detection device is presented in which a second operation circuit for generating an off-set compensation signal is provided. The second operation circuit is constructed to respectively add the output signals of each pair of light receiving elements which are arranged on the same side with respect to one of the boundary lines of the light detector at four adder circuits. Further, a first and a second differential signal between the output signals of two of the adders are produced and then multiplied with each other for forming the off-set compensation signal. Thus, the off-set of the focus error signal which has been caused by the deviation of the center of the light from the center of the light detector is by far reduced by employing a relatively simple circuit construction and without any additional optical parts. In addition, instead of using expensive circuit elements such as operational amplifiers, simple circuit elements such as dividing resistors can be used for the summation operation. In such a case the cost of the device will be much reduced. Further, with the focus error detection device of the present invention, a stable control of the focus position is realized.

What is claimed is:

1. A focus error detection device to be used in an optical system for recording/playing back information on and from a record medium, comprising:
    a light detector having four independent light receiving elements which are arranged on the side of a first and a second boundary line crossing substantially at right angles with each other;
    an optical means for directing a reflection light beam from a surface of the record medium to a light receiving surface of said light detector in such a manner as to provide an astigmatic focus;
    a first operation circuit means including a first and a second adder means each for adding output signals of two of said light receiving elements and a first subtractor means connected to said first and second adder means for generating a differential signal between output signals of said first and second adder means;
    a second operation circuit means for deriving a compensation signal, including a third and a fourth adder means each for adding output signals of two of said light receiving elements which are located on the same side with respect to said first boundary line of the light detector, a second subtractor means connected to said third and fourth adder means for generating a differential signal between output signals of said third and fourth adder means, a fifth and a sixth adder means for respectively adding output signals of two of said light receiving elements which are located on the same side with respect to said second boundary line of the light detector, a third subtractor means connected to said fifth and sixth adder means for generating a differential signal between output signals of said fifth and sixth adder means, and a multiplier means connected to said second and third subtraction means for multiplying output signals of said second and third subtraction means and generating said compensation signal; and subtraction means connected to said first and second operation circuit means, for generating a focus error signal by subtracting said compensation signal generated by said second operation circuit means from said differential signal generated by said first operation circuit means.

2. A focus error detection device as set forth in claim 1, wherein said second operation circuit means further comprises a summation means connected to each of said light receiving elements for generating a sum signal by adding output signals of each of said light receiving elements, and a dividing means connected to said multiplier means for dividing the compensation signal by said sum signal, and providing a replacement compensation signal, said dividing means connected to said subtraction means for providing said replacement compensation signal thereto in lieu of said compensation signal.

* * * * *